Oct. 27, 1925.

M. H. HANSEN

SCALE PAN

Filed Nov. 9, 1923

Inventor
Marius H. Hansen,
By Churchill Parker Paulson
Attys.

Patented Oct. 27, 1925.

1,559,093

UNITED STATES PATENT OFFICE.

MARIUS H. HANSEN, OF CHICAGO, ILLINOIS.

SCALE PAN.

Application filed November 9, 1923. Serial No. 673,666.

*To all whom it may concern:*

Be it known that I, MARIUS H. HANSEN, a citizen of the United States, residing at Chicago, in the county of Cook and State of Illinois, have invented a certain new and useful Scale Pan, of which the following is a specification.

This invention has reference to a construction for scale pans of the type having a supporting stem extending to the scale proper.

One object of my invention is to provide a scale pan which has a top surface unobstructed by a stem attachment.

Another object is to provide a construction which permits attaching of the stem to the pan after the enamelling or finish process for the pan has been completed, without danger of impairing said finish.

Still another object is the provision of a construction to secure the stem in a fixed and braced position with reference to the pan.

Still other and ancillary objects and advantages will be apparent from the following description of the scale pan shown in the accompanying drawing.

In the drawings, Figure 1 is a vertical section of a square scale pan and its support taken along the line 1—1 of Fig. 2.

Figure 1:
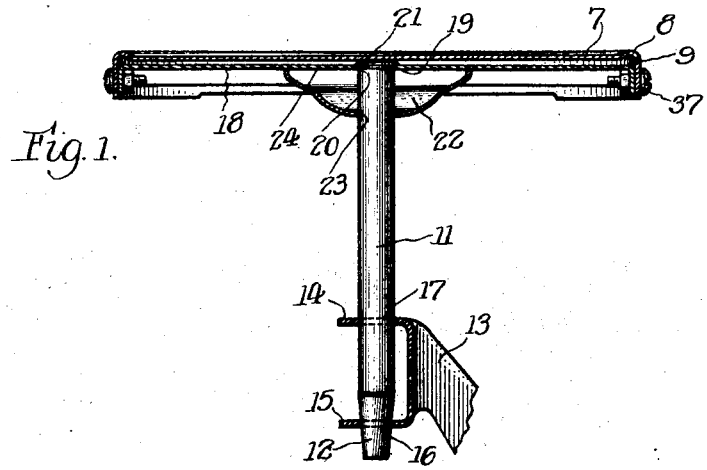
Figure 2:
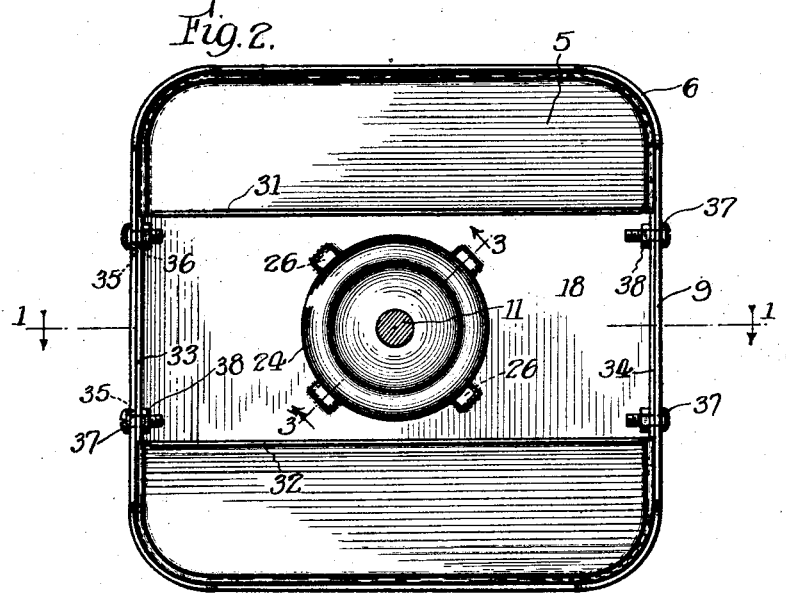
Fig. 2 is a view of the under side of the scale pan.

In the process of making scale pans, it has become common to finish the same by some process of which enamelling is a chosen example. In carrying out the finishing process, it is preferable that the pan be capable of resting flat upon a suitable supporting surface, for which reason the stem is secured to the pan after the latter has been finished. In order to secure the stem to the pan a certain measure of force is applied for a strong joint, by which there is danger of impairing the finish.

I have changed the construction heretofore commonly used, by providing an intermediate member to which the supporting stem is attached separately, said member being sufficiently large compared to the stem so that a simple union of the pan and the member forms a strong and rigid connection between the stem and the pan.

In the drawings I show a scale pan 5 of sheet metal which has been pressed to the required form. In the present instance this is a square having nicely rounded corners 6 the top surface 7 being slightly depressed from the edge 8. The edge 8 of the pan is struck downwardly to form a flange 9 completely about the pan.

The stem which I provide for the pan may be of any form which can be secured to the pan at one end and adapted for insertion or attachment to the scale mechanism at the other end. I have used a round shaft 11 for the stem. The scale in which the stem is used is adapted to hold the stem by mere insertion of the latter into a part of the scale. For this purpose I provide the end of the stem with a taper 12. In the scale the member 13 has two brackets 14 and 15 extending therefrom, the lower one 15 having a hole 16 therein to receive the tapered portion of the stem. The upper bracket 17 serves as a brace and for the purpose has a hole 17 the size of the stem itself. This form of attachment gives a strong and rigid connection between the scale and the scale pan stem.

Figure 3:
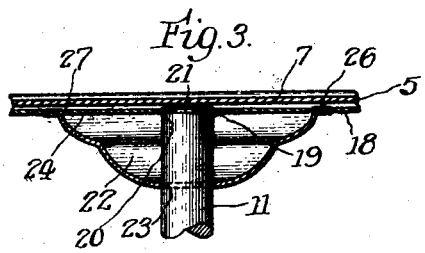
Fig. 3 is a view of the central portion of the pan along the line 3—3 of Fig. 2.

The other end of the stem 11 has a substantially similar attachment except that in this case the attachment is permanent. As already stated, I provide an intermediate member to which the stem is attached this being in the form of a piece of sheet metal generally designated 18. At the point where the stem 11 is secured at the end to the plate 18 a hole 19 is made in the plate, through which the stem extends and into which it is secured by being upset. In order to secure the stem most efficiently the end of the stem is reduced so that the hole 19 is of smaller diameter than the stem itself, thus forming a shoulder 20 on one side of the plate 18, the upset portion 21 on the other side serving to retain the stem in the plate. Away from the end 21 a suitable brace extends between the stem and the plate 18, which brace may assume a variety of forms. In the present instance, it is an annular brace in the form of a dished collar 22. The collar may be pressed from a disk of sheet material and adapted for suitable means to secure the same to the plate 18. The center of the collar is provided with a hole 23 the size of the stem, while the base of the collar rests against the plate 18 where some suitable construction secures the two immovably together. With sheet metal parts it is most convenient to strike ears or lugs in one of the members to engage the other. I prefer to form these ears as a part of the collar at the base 24 thereof (Fig. 3) and to provide suitable slots in the plate 18 for the reception of these ears. Herein are shown four such ears 26 which originally are extended parallel to the stem when the collar is positioned on the latter in the assembling operation. Slots 27 are formed in the plate 18 to receive the ears 26 which are then bent over in completing this portion of the assembling operation.

I have now described how the stem is secured to the plate 18, forming thereof a T-shaped member so that there now remains to be shown the relation of this T-shaped member to the scale pan. The plate 18 is formed with one dimension substantially in common with one dimension of the pan whereby the same will fit easily within the under side of the finished pan 5. I have shown the sheet 18 completed as a rectangular plate having the four sides provided with downwardly-extending flanges 31, 32, 33 and 34. The flanges 31 and 32 are merely for imparting strength to the plate 18 to remove flexibility, while the flanges 33 and 34 serve to secure the plate to the pan.

As stated above, the length of the plate 18 is such as to fit loosely within opposite side flanges of the scale pan. In the scale pan before the finishing process is carried out, opposite sides of the flange are similarly provided with holes 35 and the flanges 33 and 34 of the plate are provided with corresponding holes 36. In assembling the pan the holes 35 and 36 are brought into register and headed screws 37 with nuts 38 are inserted, the latter serving to draw the flanges 33 and 34 into contact with the flange 9 to secure them together.

While I have shown in the drawings and described a scale pan attached to a single stem, I do not limit the invention to the exemplary embodiment herein disclosed. It is obvious that a plurality of stems may be secured to a scale pan in the manner herein set forth without departing from the spirit of my invention as expressed in the appended claims.

I claim as my invention:

1. In a scale pan having a supporting stem, an intermediate member between the stem and the pan to which member the stem is secured, means to secure the intermediate member to the scale pan, said member having a hole therein, the stem having a reduced portion forming a shoulder abutting the member at the hole, the reduced portion passing through the hole and being upset to engage the member on the other side, a dished collar about said stem having contact with said member, and ears on said collar passing through slots in the member to the to the other side thereof where they are bent to attach the collar to the member.

2. A scale pan having, in combination, a plate with a hole therein, a stem having a reduced end passing through said hole, the end of the reduced portion being upset to retain the stem in the plate, a dished collar having a hole therein the size of the stem, ears on said collar at the base, the plate being provided with slots to receive said ears whereupon the collar contacts the plate, the ears being bent to retain the collar to the plate, a pan member, and means to secure the pan member to the plate.

In testimony whereof, I have hereunto affixed my signature.

MARIUS H. HANSEN.